United States Patent [19]

Shirakawa et al.

[11] Patent Number: 4,675,773
[45] Date of Patent: Jun. 23, 1987

[54] TRANSMISSION LINE PROTECTION SYSTEM

[75] Inventors: Shingo Shirakawa; Seiichi Maruyama, both of Hitachi; Seizo Nakano, Mito; Eichi Okamoto; Kenji Kohara, both of Hiroshima, all of Japan

[73] Assignees: Hitachi, Ltd., Tokyo; The Chugoku Electric Power Co., Inc., Hiroshima, both of Japan

[21] Appl. No.: 795,265

[22] Filed: Nov. 5, 1985

[30] Foreign Application Priority Data

Nov. 5, 1984 [JP] Japan .................................. 59-231285

[51] Int. Cl.$^4$ .............................................. H02H 7/26
[52] U.S. Cl. ........................................ 361/63; 361/62; 361/93; 361/107
[58] Field of Search ...................... 361/62, 63, 93, 107

[56] References Cited

U.S. PATENT DOCUMENTS

| | | | |
|---|---|---|---|
| 3,259,762 | 6/1966 | Skuderna | 361/107 |
| 3,992,649 | 11/1976 | Kotheimer et al. | 361/63 |
| 4,321,645 | 3/1982 | Thom et al. | 361/63 |
| 4,393,430 | 6/1983 | Hughes | 361/62 |

Primary Examiner—J. R. Scott
Assistant Examiner—Jeffrey A. Gaffin
Attorney, Agent, or Firm—Antonelli, Terry & Wands

[57] ABSTRACT

A transmission line protection system arranged such that a leakage current detector is provided at an end of an insulating device such as an insulator connected at one end to a corresponding one of arms of a steel tower and connected at the other end to a transmission line of each phase, thereby detecting an arrester leakage current flowing in the transmission line of each phase, an output signal of the leakage current detector being led to a repeater through an optical fiber cable, an output of the repeater being transferred to a control/supervisory board in a substation through an optical fiber cable. In the control/supervisory board, preferably, a received digital signal which was converted from an analog signal at said leakage current detector is displayed on a cathode ray tube. In such an arrangement, it is possible to smoothly perform supervision of the status of the transmission lines without causing maloperations due to influences from the transmission lines.

9 Claims, 5 Drawing Figures

TRANSMISSION LINE PROTECTION SYSTEM

BACKGROUND OF THE INVENTION

1. Field of the Invention

The invention relates to a protection system for aerial transmission lines.

2. Description of the Prior Art

Conventionally, aerial transmission lines for transmitting high voltage power are structured such that transmission lines of the respective phases are supported on arms of steel towers through suspension insulators. Recently, there is such a proposal that an arrester of zinc oxide constituted by a plurality of non-linear elements is inserted between each transmission line and a steel tower arm so as to make it possible to maintain a normal operation even in case of a thunder-bolt fault to supply power without interrupting service, as disclosed in the specification of Japanese Patent Unexamined Publication No. 86141/78.

Alternatively, arresters are used to cut off abnormal peak voltages in case of a thunder-bolt to thereby supply normal power.

Under the circumstances where stability and high reliability are required in supplying power, it becomes necessary to provide a transmission line protection system for supervising the state of contamination of the insulators or the like which are constituent components of the transmission lines and the occurrence of overvoltages in the transmission lines. Even if an overvoltage detecting means for apparatuses equipped on the ground in ordinary substations is intended to be applied as it is to a transmission line protection system, it is impossible to utilize such a means because the transmission lines are disposed at high positions, and in the case where the state of contamination or the overvoltage in the transmission lines is detected by such a means, a malfunction is caused due to a phenomenon of induction or the like, so that it is made difficult to perform highly reliable supervision of the transmission lines.

SUMMARY OF THE INVENTION

It is an object of the present invention to provide a transmission line protection system in which the state supervision of the transmission lines can be smoothly performed without causing malfunctions due to influences from the transmission lines.

It is another object of the present invention to provide a transmission line protection system in which the status of running voltages of the transmission lines and the deterioration in arresters can be easily detected by a leakage current detector.

In order to attain the above-mentioned objects, the transmission line protection system according to the present invention is arranged such that a leakage current detector is provided at an end of an insulating means such as an insulator connected at one end to an arm of a steel tower and at the other end to a transmission line of each phase, an output signal of the leakage current detector being led to a repeater through an optical fiber cable, an output of the repeater being transferred to a control board in a substation through an optical fiber cable.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
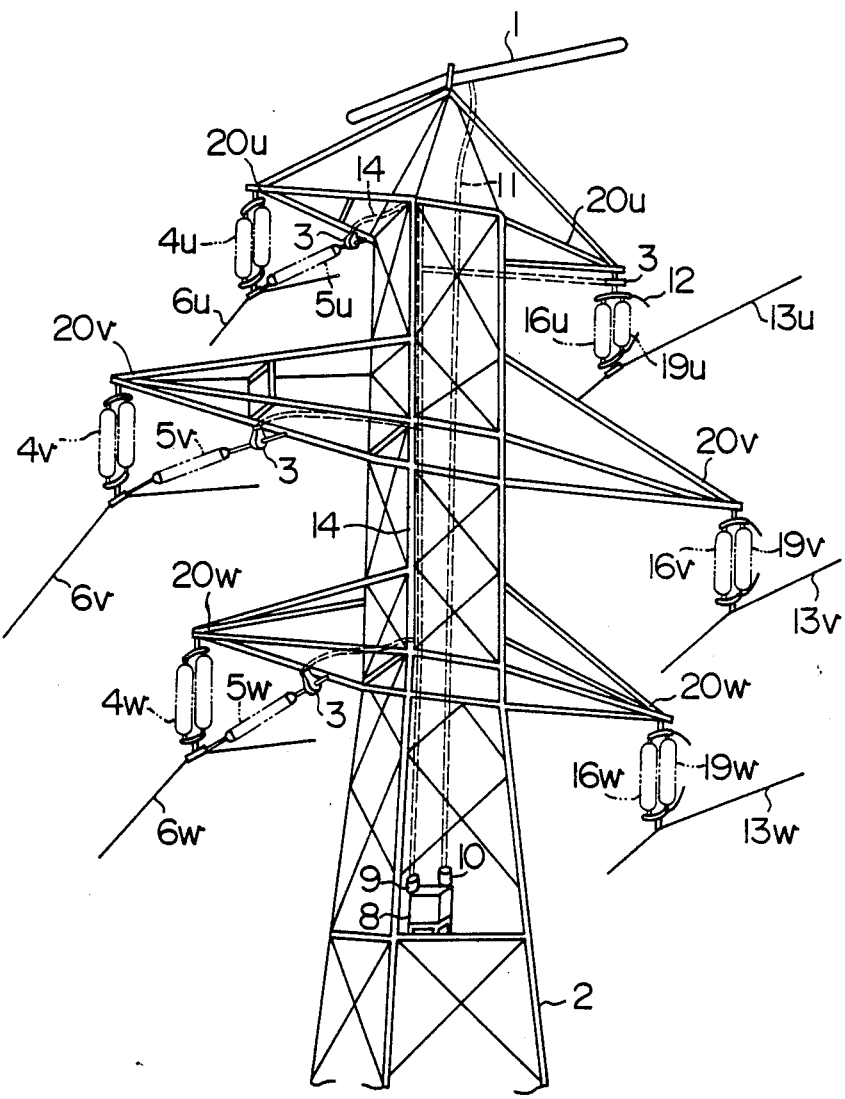
FIG. 1 is a perspective view of an embodiment of the transmission line protection system according to the present invention when viewed slantingly from a position in front of the system.

FIG. 1 is a perspective view of an embodiment of the transmission line protection system according to the present invention when viewed slantingly from a position in front of the system, in which a steel tower 2 is provided with a plurality of steel tower arms 20u, 20v, and 20w. Transmission lines 6u, 6v and 6w are supported by the respective tower arms 20u, 20v, and 20w through suspension insulators 4u, 4v, and 4w, respectively. Respective one ends of arresters 5u, 5v, and 5w are connected to the transmission lines 6u, 6v, and 6w of the respective phases and the respective other ends of the arresters 5u, 5v, and 5w are connected to the tower arms 20u, 20v, and 20w disposed at positions slantingly above the transmission lines. Thus, an arrangement for one set of transmission lines is provided at the left side of the steel tower 2. The same arrangement may be provided at the right side of the steel tower 2 for another set of transmission lines as an embodiment of the invention, while FIG. 1 illustrates another embodiment in which the arrangement at the right side is different from that provided at the left side. That is, at the right side of the steel tower 2, arresters 16u, 16v, and 16w are constituted by arrester elements, etc., respectively received within suspension insulators 19u, 19v, and 19w supporting respective transmission lines 13u, 13v, and 13w. In other words, each of the arresters 16u, 16v, and 16w acts also as a suspension insulator.

Figure 2:
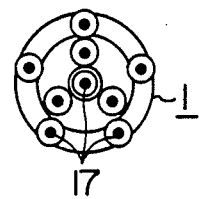
FIG. 2 is a cross-section of the aerial optical fiber grounding line shown in FIG. 1.

An aerial grounding wire 1 is stretched at the top of the steel tower 2. The aerial grounding wire 1 in the embodiment illustrated in FIG. 1 is an optical grounding wire (OPGW) the internal structure of which is illustrated in FIG. 2. As seen in FIG. 2, optical fiber cables are embedded at the center of the aerial grounding wire 1.

In the thus arranged aerial transmission line system, numbers of insulating means are provided between the transmission lines and the tower arms. As the insulating means, there are illustrated in the drawing suspension insulators 4u, 4v, 4w, 19u, 19v, and 19w, and arresters 5u, 5v, 5w, 16u, 16v, and 16w, however, other insulators, porcelain tubes, and the like, may be included. For each respective phase, at least one of a plurality of insulator means which are connected at their one ends to a transmission line of the phase is provided with a leakage current detector 3, in such a manner as will be described later, at the other end of at least one insulator means at which the one insulator is connected to a tower arm. The leakage current detectors 3 for the respective phases are fixedly attached on the corresponding tower arms.

A repeater 8 is provided on the steel tower 2 at a given position where a worker can work easily even in feeding time of the transmission lines. An input and output terminal 9 and 10 of the repeater 8 are connected to each leakage current detector 3 and the optical fiber cable 17 of the aerial grounding wire 1 through optical fiber cables 14 and 11 respectively. Accordingly, the signal from each leakage current detector 3 is transferred to a not-shown control board in a substation through the optical fiber cable 14, the repeater, the optical fiber cable 11, and the aerial grounding wire 1. In the substation, the received digital signal which is converted from an analog signal in the leakage current detector 3 is displayed on a cathode ray tube so as to perform control operations.

In such an arrangement, if voltages are applied on the transmission lines 6u, 6v, 6w, 13u, 13v, and 13w, arrester leakage currents flow and are detected by the corresponding leakage current detectors 3, thereby detecting the state of running voltages on the transmission lines. In the case where a ground-fault occurs on any transmission lines, the voltage on the transmission line disappears and the arrester leakage current becomes zero, whereby the ground-fault can be detected. Further, in the case where any one of the arresters 5u, 5v, 5w, 16u, 16v, and 16w has deteriorated or any porcelain tube or the like has been extremely contaminated, the existence of such a matter can be detected on the basis of the increase in leakage current or on the basis of the difference in leakage current between the leakage current detector 3 and any one of other leakage current detectors 3. Similarly, the position of a thunder-bolt can be detected on the basis of the time lag of the signal current. Further, the repeater 8 is disposed at a position below the lowermost transmission lines 6w and 13w at the ground side, so that the maintenance and inspection of the repeater 8 can be performed safely.

Figure 3:
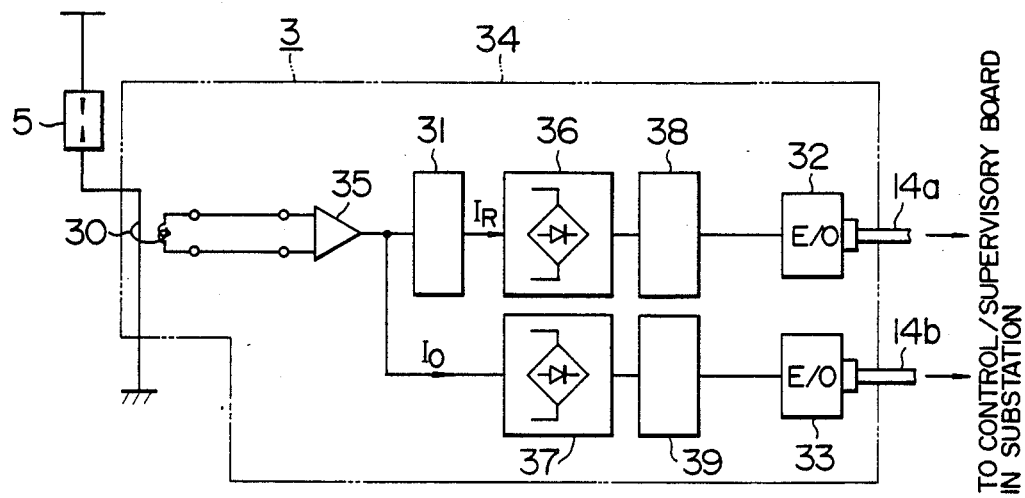
FIG. 3 is a circuit diagram of an example of the leakage current detector of FIG. 1.
Figure 4:
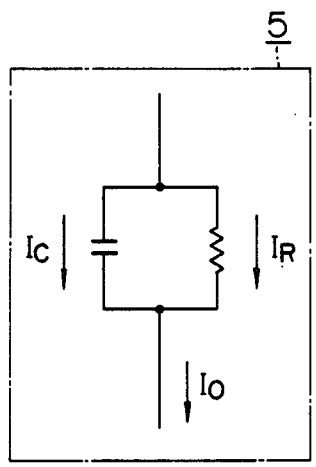
FIG. 4 is an equivalent circuit diagram of an arrester used according to the present invention.
Figure 5:
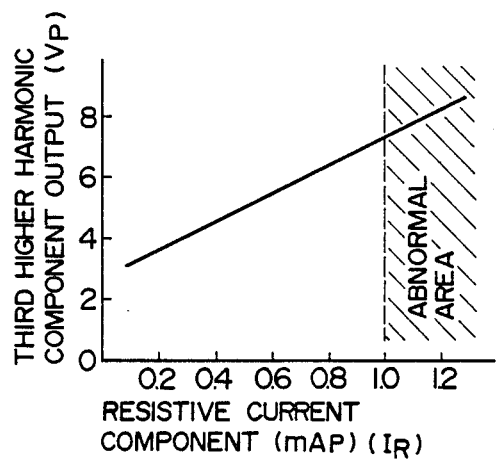
FIG. 5 is a characteristic diagram showing the relationship between the third higher harmonic component and the resistive current for explaining the present invention.

Referring to FIGS. 3 to 5, the leakage current detector 3 will be described.

A detector element 30 provided at the tower arm side end of each of the arresters 5u, 5v, and 5w, detects the total leakage current $I_o$, as shown in FIG. 4, which is in turn led through a buffer amplifier into parallel connected first and second circuits, the first circuit being constituted by a band-pass filter 31, a rectifier 36, an A/D converter 38, and an electrooptical transducer 32, the second circuit being constituted by a rectifier 37, an A/D converter 39, and an electro-optical transducer 33. The total leakage current $I_o$ is composed of a resistive current component $I_R$ and a capacitive current component $I_C$. The total leakage current $I_o$ supplied to the first circuit is first filtered by the band-pass filter 31 such that only the resistive current component $I_R$ is separated from the total leakage current $I_o$ and then supplied to the rectifier 36 to be rectified. The rectified analog signal from the rectifier 36 is A/D converted by the A/D converter 38 into a digital signal which is in turn converted into an optical signal by the electro-optical transducer 33. Similarly to this, the total leakage current $I_o$ supplied to the second circuit is rectified by the rectifier 37, A/D converted by the A/D converter 39, and then converted into an optical signal by the electro-optical transducer 33. The respective optical output signals from the first and second circuits are led into a control/supervision board in a substation (not shown) through optical fiber cables 14a and 14b respectively. Such a detector 3 is received in a shielding casing 34 so as to be protected from the influence by an electric and a magnetic field.

The deterioration in each of the arresters 5u, 5v, 5w, 16u, 16v, and 16w can be detected by detecting an increase in the resistive current component $I_R$. In order to detect an increase in the resistive current component $I_R$, there have been proposed various methods, and in one of the most effective method, the increase is detected by an increase in the third higher harmonic component of the total leakage current $I_o$. FIG. 5 shows the relationship between the output of the third higher harmonic component and the resistive current component $I_R$.

Since the foregoing leakage current detector 3 is arranged such that the total leakage current $I_o$ and the resistive current component $I_R$ are transferred through the repeater 8 to a control/supervisory board in a substation (not shown), it is possible to judge which one of the causes, the increased voltage on the transmission line or the deterioration in the arrester, makes the total leakage current $I_o$ increase, by supervising changes while comparing the total leakage current $I_o$ and the resistive current component $I_R$ with each other.

In realizing the present invention, the leakage current detector 3 is not limited to such an arrangement as shown in FIGS. 3 to 5, but any other suitable arrangement may be employed. Further, the leakage current detector 3 may be disposed at a tower arm side end of any insulating means other than the arrester so as to detect the running voltage status of the transmission line and/or the contamination status of the insulating means to thereby attain the foregoing objects of the present invention. Further, although the output of the repeater 8 is led to a control/supervisory board in a substation through the aerial optical grounding wire (OPGW) in the foregoing embodiments, any other transferring means, for example, any other optical system, may be used for the purpose. In any of the foregoing embodiments, a leakage current detector 3 is provided at a tower arm side end of an insulator means and connected to a repeater 8 through an optical fiber cable 14 to thereby obtain a transmission protection system which does not suffer a bad influence such as induction from the transmission lines in spite of the fact that the system is provided in the vicinity of the transmission lines. Generally, an aerial optical grounding wire (OPGW) is used for the purpose to supply data concerning weather conditions such as wind velocity, temperature, humidity, and so on, into a repeater 8 in which the input data are converted into an optical signal to be transferred to a control/supervisory board in a substation. The present invention can be easily applied to an aerial transmission line system where such an aerial optical grounding wire (OPGW) has been provided.

As described above, according to the present invention, since a leakage current detector provided at a tower arm side end of an insulator means is connected with a repeater through an optical fiber cable, it is possible to obtain a transmission protection system which does not suffer a bad influence such as induction from the transmission lines in spite of the fact that the system is arranged in the vicinity of the transmission lines, and therefore can supply power with high reliability with no maloperations.

Further, according to the present invention, since the input digital data which was converted from an analog signal at a leakage current detector is displayed on a cathode ray tube of the control/supervisory board, the transmission line protection system has such a remarkable advantage that an abnormal position on the transmission line can be detected easily.

We claim:

1. A transmission line protection system in which a transmission line of each phase is supported on a corresponding one of arms of a steel tower through insulating means, said system comprising:
   a leakage current detector provided at one end of at least one insulator means connected between said transmission line of each phase and said corresponding one tower arm at the other end and said one end of said insulator means respectively, for detecting a leakage current of said insulating means flowing in said transmission line of each phase;
   a repeater for receiving a signal from said leakage current detector; and
   an optical fiber cable connected between said leakage current detector and said repeater.

2. A transmission line protection system according to claim 1, in which said insulator means includes a suspension insulator having nonlinear elements.

3. A transmission line protection system in which a transmission line of each of phases is supported on a corresponding one of arms of a steel tower through a suspension insulator, said system comprising:
   an arrestor provided between said transmission line of each phase and said corresponding tower arm;
   a leakage current detector provided at a tower arm side end of said arrester, for detecting an arrester leakage current flowing in said transmission line of each phase;
   a repeater for receiving a signal from said leakage current detector; and
   an optical fiber cable connected between said leakage current detector and said repeater.

4. A transmission line protection system according to claim 3, in which said repeater is disposed at a position below the lower-most one of the transmission lines of the respective phases.

5. A transmission line protection system according to claim 3, in which said leakage current detector is disposed with in a shielding casing.

6. A transmission line protection system according to claim 3, in which respective one ends of said arrester and said suspension insulator are connected to said transmission line of each phase, the other end of said arrester being connected to one end of said corresponding tower arm, the other end of said suspension insulator being connected to the other end of said corresponding tower arm.

7. A transmission line protection system according to claim 3, in which said arrester and said suspension insulator are connected in parallel with each other between respective one ends of said transmission line of each phase and said corresponding tower arm.

8. A transmission line protection system in which a transmission line of each phases is supported on a corresponding one of arms of a steel tower through a suspension insulator, said system comprising:
   an arrester provided between said transmission line of each phase and said corresponding tower arm;
   a leakage current detector provided at a tower arm side end of said arrester, for detecting an arrester leakage current flowing in said transmission line of each phase;
   a repeater for receiving a signal from said leakage current detector; and
   an optical fiber cable connected between said leakage current detector and said repeater;
   said leakage current detector being arranged to supply a total leakage current of said arrester and a resistive current component of said total leakage current to said repeater.

9. A transmission line protection system according to claim 8, in which the third higher harmonic component of said total leakage current is used as said resistive current component.

* * * * *